United States Patent [19]

McDonald et al.

[11] 4,293,978
[45] Oct. 13, 1981

[54] POULTRY HEAD PULLING APPARATUS

[75] Inventors: David M. McDonald, Kansas City, Kans.; Donald J. Scheier, Kansas City, Mo.

[73] Assignee: Simon-Johnson, Inc., Kansas City, Mo.

[21] Appl. No.: 81,008

[22] Filed: Oct. 1, 1979

[51] Int. Cl.$^3$ .............................................. A22C 21/00
[52] U.S. Cl. ......................................................... 17/12
[58] Field of Search ............................................ 17/12

[56] References Cited

U.S. PATENT DOCUMENTS

| 2,874,402 | 2/1959 | Boykin | 17/12 |
| 3,956,794 | 5/1976 | Verbakel | 17/12 |

*Primary Examiner*—Willie G. Abercrombie
*Attorney, Agent, or Firm*—Schmidt, Johnson, Hovey & Williams

[57] ABSTRACT

In the processing of poultry, the heads are separately and individually pulled downwardly along a vertical path during continuous advancement to automatically separate the heads from the necks at the jaw bone and at the base of the skull, salvaging all of the edible neck skin, while at the same time, removing certain inedible organs from within the body by pulling the same straight down through the vertical neck without separation of the head from either the esophagus or the trachea.

2 Claims, 14 Drawing Figures

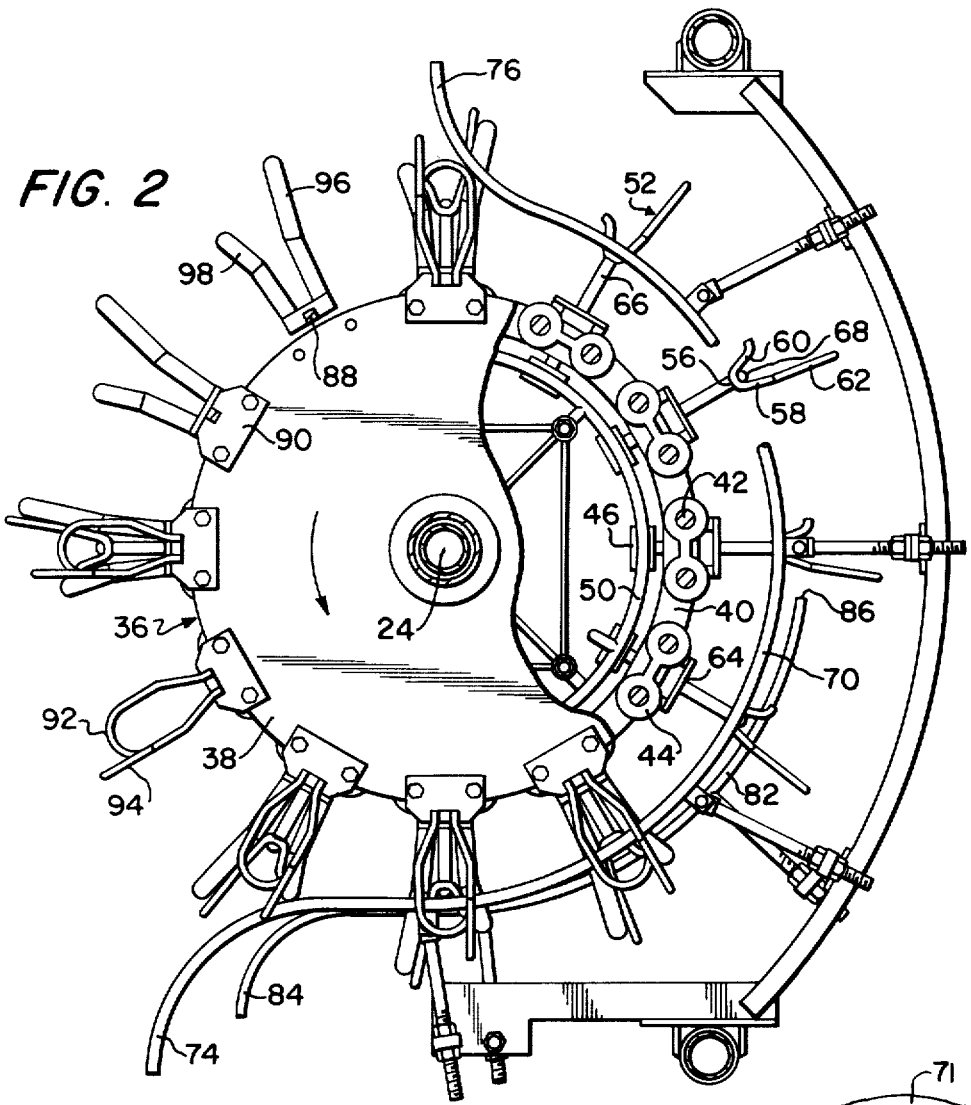
FIG. 2
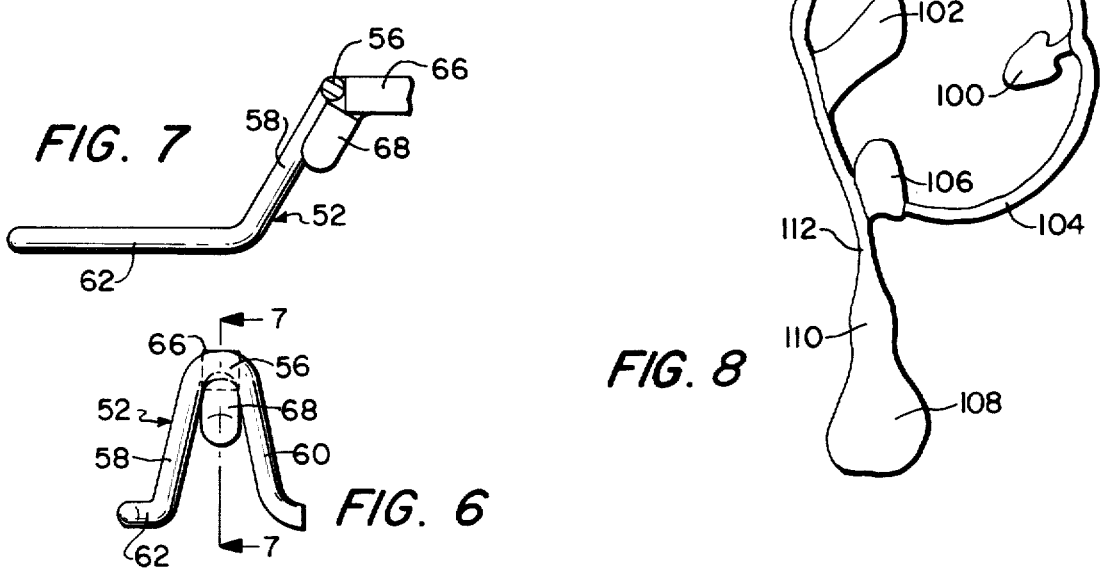
FIG. 7
FIG. 6
FIG. 8

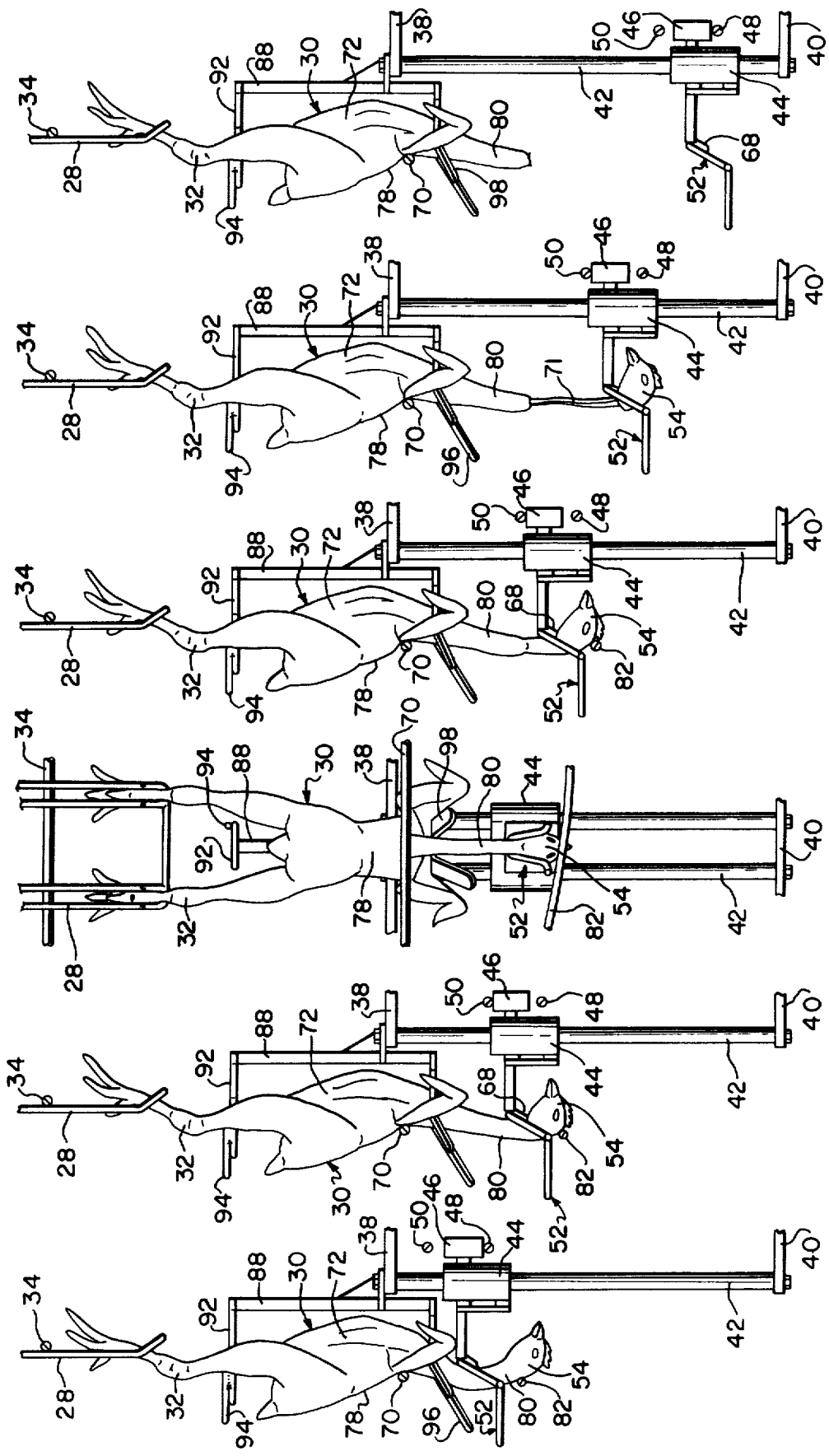

POULTRY HEAD PULLING APPARATUS

Poultry processing procedures require minimization of hand labor and the time required for placing the birds in condition for marketing. All waste and by-products must be fully and quickly removed in a sanitary manner while preserving as much of the edible portions of the bird as possible. One difficult task is to separate the head from the neck without waste of a considerable amount of the edible neck skin. Also, it is quite advantageous, in the same operation, to automatically remove as many of the internal organs and other inedibles as possible while the head is being separated from the neck.

Such advantages in time and labor are accomplished through use of our present invention by virtue of the fact that each bird is handled individually as a continuous series of birds is advanced rapidly and uninterruptedly through use of an overhead conveyor. In so doing, all parts of each bird are so oriented and held that the head is separated from the vertebra and from the neck skin closely adjacent the skull. Additionally, the head is acted upon in a manner to cause it to pull a portion of the alimentary canal through the neck, bringing with it the esophagus, the trachea, the crop and all parts contained within the head itself.

We consider our machine to be novel and an improvement over and above all prior attempts to accomplish our purposes, including the suggestions of the following U.S. Letters Patent with which we are aware: Nos.

Cunningham 1,389,784
Fortne 2,632,200
Fosdick 2,793,393
O'Donnell 2,828,506
Van Dolah 2,846,720
O'Donnell 2,854,690
Boykin 2,874,402
Zebarth 2,924,846
Steck 2,926,383
Zebarth 2,993,228
Reeves 3,017,660
Hooley 3,271,815
Hooley 3,277,514
Barbour 3,514,809
Van Mil 3,737,948
Verbakel 3,956,794

In the drawings:

FIG. 2 is a fragmentary cross sectional view taken on line 2—2 of FIG. 1;

FIG. 6 is an enlarged end view of one of the neck receiving loops;

FIG. 7 is a cross sectional view taken on line 7—7 of FIG. 6;

FIG. 8 is a schematic view illustrating certain of the offal of the birds; and

FIGS. 9-14 are views of a bird in its various positions while advancing through the apparatus shown in conjunction with but certain portions of the apparatus, all for the purpose of providing an understanding of the method.

Figure 1:
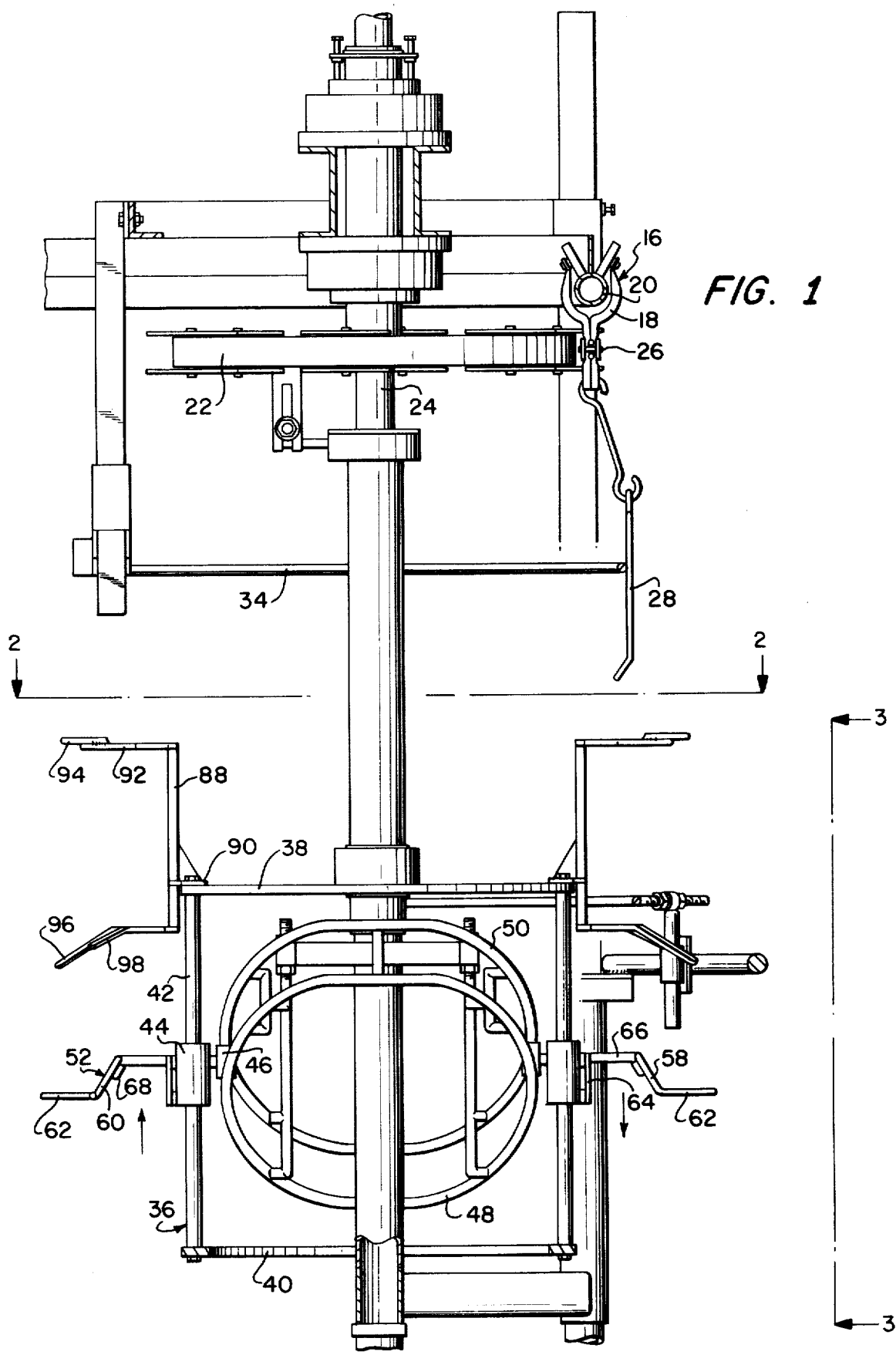
FIG. 1 is a fragmentary side elevational view of a poultry head pulling apparatus made in accordance with our present invention and capable of carrying out our novel method, shown in connection with an overhead conveyor section with certain associate parts.
Figure 3:
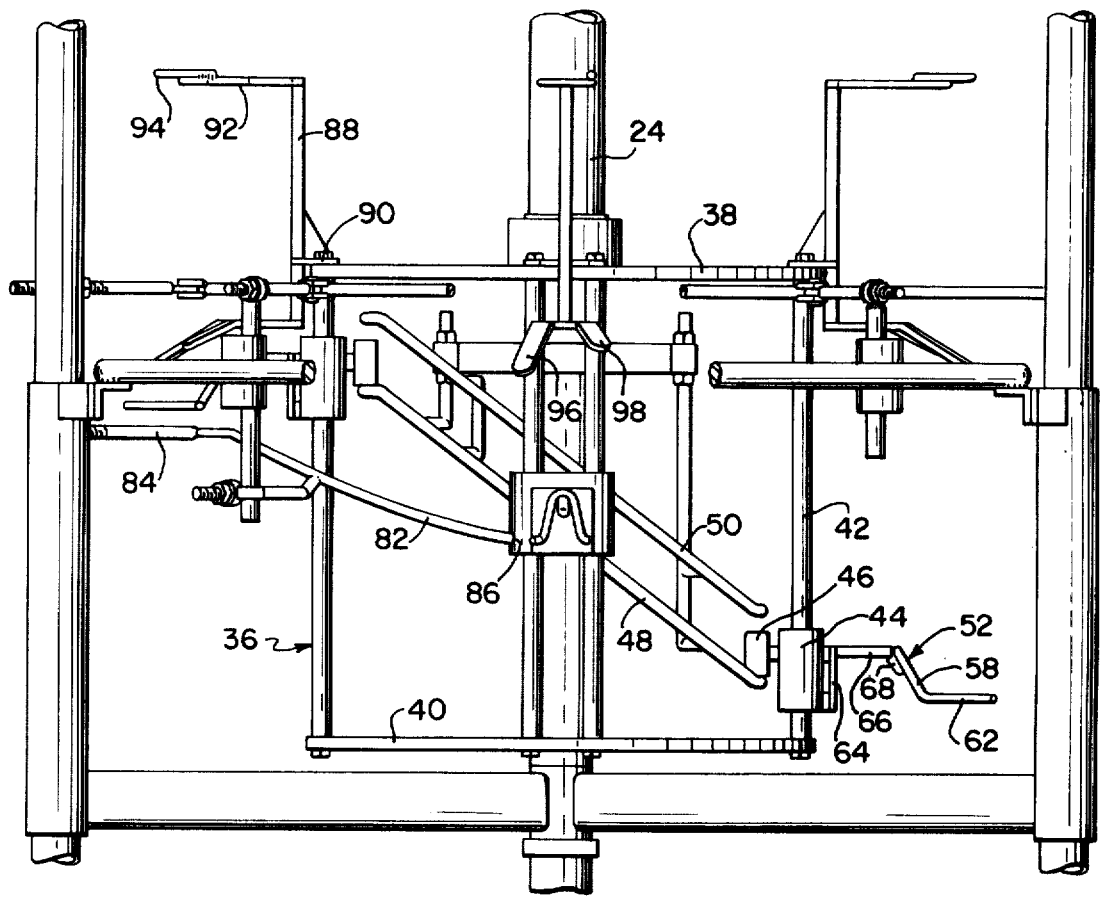
FIG. 3 is a fragmentary cross sectional view taken on line 3—3 of FIG. 1.

In FIG. 1 of the drawings an arcuate section 16 of an overhead conveyor is shown supporting a wheeled trolley 18 on its rail 20, driven by a sprocket wheel 22 that is rotatable about an upright axis 24. The trolleys 18 are interconnected by a chain 26 and each trolley 18 suspends a shackle 28 for suspending a bird 30 (FIGS. 9-14) by its legs 32 in a head down position, the shackles 28 sliding around a guide 34 disposed in an arcuate path comparable to the configuration of the rail section 20 and concentric to the axis 24.

Figure 4:
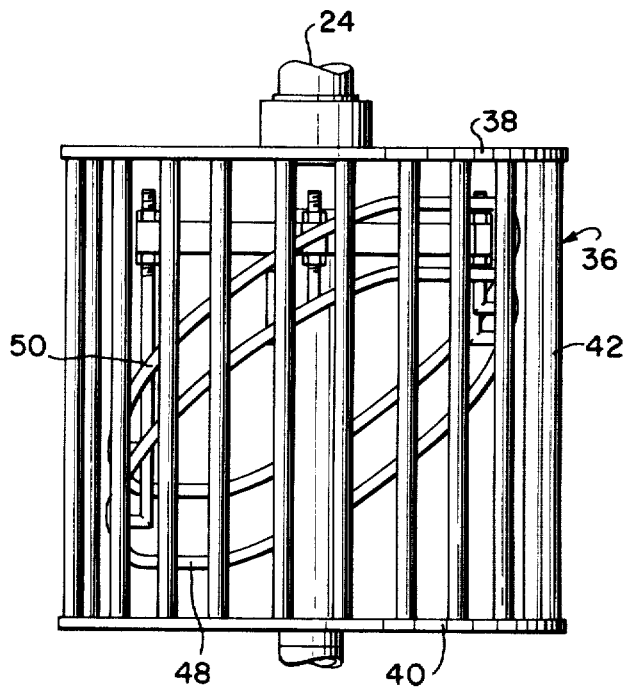
FIG. 4 is a fragmentary side elevational view showing a portion of the rotor entirely removed from the apparatus.
Figure 5:
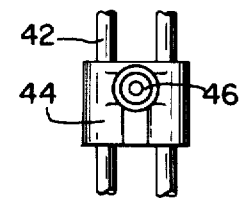
FIG. 5 is a fragmentary detailed inner view of one of the reciprocable blocks.

A rotor 36 (FIGS. 1-4) beneath the guide 34, driven by, and therefore, timed with the wheel 22, is supported for rotation about the axis 24 and has an upper, circular disc 38 and a lower angular ring 40, interconnected by upright rods 42 (FIG. 4) arranged in pairs (FIGS. 2, 3, 5 and 11) with each pair supporting a vertically reciprocable, double sleeve block 44 (FIGS. 1-3, 5 and 9-11).

Each block 44 has an inner roller 46 which travels between a pair of vertically spaced and vertically aligned, continuous, stationary tracks 48 and 50 sloped within the roller 36 such that the lower track 48 raises the rollers 46 during approximately one-half the revolution of the roller 36 and the upper track 50 thereupon lowers the rollers 46 to, in turn, raise and lower the blocks 44 on the rods 42.

Each block 44 has an outer, V-shaped loop 52, for capturing the heads 54 of the birds 30 (FIGS. 9-11) provided with a bight 56 and a pair of legs 58 and 60 that extend downwardly and outwardly from the bight 56 and diverge as their lower ends are approached (FIG. 6). The legs 58 and 60 also slope outwardly and downwardly (FIG. 7) and the lower end of the leg 58 terminates in an outwardly extending, horizontal arm 62 (FIG. 7) which is essentially radial to the axis 24 (FIG. 2).

Each block 44 has an outer plate 64 provided with an extension 66, normal thereto and radial to the axis 24, which carries the bight 56 at its outer end as well as an abutment 68 for pinching the esophagus 71 of the bird 30 (FIG. 8) against the roof of the birds mouth. The abutment 68, angled much the same as the legs 58 and 60, extends between the latter from the extension 66, and therefore, the bight 56, but a short distance (FIGS. 6 and 7).

An arcuate, horizontal guide 70 for the body 72 of the bird 30, having outer end flares 74 and 76 (FIG. 2), is disposed to engage the bird's backs 78 adjacent their necks 80 (FIGS. 9-14). An arcuate guide 82, lower than the guide 70, has an outer end flare 84, terminating in an opposite end 86, sloping downwardly as the end 86 is approached and disposed to engage the back of the heads 54 (FIGS. 9-12). A standard 88 above each block 44 is carried by a bracket 90 secured to the disc 38 and is provided with an outwardly extending leg separator 92 on its upper end, together with a short pusher prong 94. The lower end of each standard 88 has a pair of spaced, outwardly diverging, neck receiving fingers 96 and 98 provided with downwardly inclined terminals between the guides 70 and 82 and above the loops 52.

OPERATION

The overhead conveyor advances the uninterrupted train of pendulously suspended birds 30 to the flares 74 and 84 (FIG. 2) which operate to urge the necks 80 into the loops 52 and between the fingers 96 and 98, bringing the legs 32 into straddling relationship to the separators 92. The guides 70 and 82 hold the birds 30 pressed inwardly toward the axis 24 as the prongs 94, the fingers 96 and the arms 62 cause the backs 78 to slide along the guide 70 and the heads 54 to slide along the guide 82, avoiding any tendency of pile up of the birds 30 as the legs 32 are pulled along by the conveyor section 16. The birds 30 continue to be vertically suspended and equally spaced until they exit at the flare 76 after traveling some 180°.

The head tilting guide 82 operates at the outset (FIG. 9) to orient the heads 54 such as to point the beaks inwardly toward the axis 24, and the guide 70 operates to orient the shoulders of the birds 30 into overlying engagement with the fingers 96 and 98, holding the birds 30 against descent.

Shortly after such initial orientation of the birds 30, as depicted in FIG. 9, the rollers 46 will have moved to a position in engagement with the guide 50 therebelow (FIG. 10), causing the blocks 44 to descend along the rods 42, thereby causing the loops 52 to move downwardly away from the fingers 96 and 98, stretching the necks 80.

This results in the throats of the birds at the larynx, and adjacent the heads 54, to become pressed tightly against the abutment 68 because of the cooperating action of the guide 82 which slopes downwardly toward the end 86 such that the heads 54 become engaged with the guide 82 adjacent the combs (FIGS. 10-12).

As the blocks 44 continue to descend toward the position shown in FIG. 12 the throats of the birds 30 are progressively gripped more tightly between the throat traversing abutment 68 and the guide 82, pinching the esophagus 71 tightly against the roof of the mouth such that the head 54 will not separate from the esophagus 71 and neither the larynx nor the other parts (broadly designated 100 in FIG. 8) will be pulled from within the head 54.

At the same time, the neck skin will become so taut and thin at the head 54 and adjacent the base of the skull as to lose its strength against tear and rupture, whereby, during continued advancement toward the position shown in FIG. 13, the neck skin will fracture and break away from the head 36 at the base of the skull and at the jaw bone, leaving all of the edible portions of the neck 80 attached to the body 72 as shown in FIGS. 13 and 14. Moreover, the action will cause the head 54 to break away from the vertebra at the skull.

The grip of the abutment 68 and the guide 82 on the esophagus 71 and the engagement of the legs 58 and 60 with the head 54 will loosen the esophagus 71, as well as the crop 102 and the trachea 104 within the body 72, causing the esophagus 71 to break away between the crop 102 and the lungs 106 and the trachea 104 to break away from the lungs 106.

As movement continues from the position shown in FIG. 13 to the position shown in FIG. 14, such inedibles as the crop 102, the trachea 104, the pharnyx and the esophagus 71 will be pulled from within the body 72, leaving the lungs 106, the gizzard 108, the proventriculus 110, the intestines (not shown) and a portion 112 of the alimentary canal all within the body 72 for subsequent removal as additional eviscerating steps take place after the birds 30 move beyond the flare 76.

Notable in FIG. 14 is that the rollers 46 move to a position in overlying engagement with the track 48 such that the latter raises the blocks 44 from adjacent the ring 40 to a position adjacent the disc 38 (FIG. 9) as the roller 36 moves the blocks 44 from the zone of the flare 76 to the zone of the flares 74 and 84 (FIG. 2).

We claim:

1. For use with an arcuate section of an overhead conveyor having means for uninterrupted horizontal advancement of a continuous train of birds pendulously suspended by their legs in a head down position, apparatus for processing said birds as they are advanced, said apparatus including:
    a rotor beneath the conveyor at said section mounted for rotation about an upright axis in timed relationship to said conveyor;
    stationary guide means for maintaining the bodies of the birds confined to an arcuate path of travel spaced radially outwardly from said axis;
    means attached to said rotor and rotatable therewith for separately capturing the head of each suspended bird as the birds are advanced;
    means attached to said rotor and rotatable therewith for separately capturing the necks of each suspended bird as the birds are advanced, and having means for holding the bodies of the birds against descent as the birds are advanced,
    each of said head capturing means having means for holding the neck skin of the captured head in a taut condition as the birds are advanced; and
    means for progressively and separately lowering said head capturing means with respect to the rotor as the latter rotates until the heads are separated from neck skins adjacent their heads and until the heads pull the trachea, esophagus and crop from within the birds through their necks,
    each head capturing means being provided with means for holding the heads oriented to point their beaks inwardly toward said axis,
    with means for tilting the heads upwardly and inwardly toward said axis as the head capturing means is lowered during rotation thereof,
    with means about which the head is tilted across a line extending transversely of the throat adjacent the larynx for pinching the esophagus against the roof of the mouth and
    with an essentially V-shaped loop having a bight, a pair of legs diverging downwardly and outwardly from said bight and a horizontal arm extending outwardly from one of the legs.

2. The invention of claim 1 wherein each esophagus pinching means includes an abutment extending downwardly and outwardly from said bight between said legs.

* * * * *